United States Patent
Funk et al.

(10) Patent No.: US 12,433,655 B2
(45) Date of Patent: Oct. 7, 2025

(54) SYSTEMS AND METHODS FOR MONITORING THE CURE OF PMMA BONE CEMENT DURING SURGERY

(71) Applicant: ORTHOPATENT, LLC, Cincinnati, OH (US)

(72) Inventors: Daniel A. Funk, Cincinnati, OH (US); Quang-Viet Nguyen, Aldie, VA (US)

(73) Assignee: ORTHOPATENT, LLC, Cincinnati, OH (US)

( * ) Notice: Subject to any disclaimer, the term of this patent is extended or adjusted under 35 U.S.C. 154(b) by 375 days.

(21) Appl. No.: 18/112,185

(22) Filed: Feb. 21, 2023

(65) Prior Publication Data

US 2023/0301698 A1   Sep. 28, 2023

Related U.S. Application Data

(60) Provisional application No. 63/320,002, filed on Mar. 15, 2022.

(51) Int. Cl.
*A61B 17/88* (2006.01)
*A61F 2/46* (2006.01)

(52) U.S. Cl.
CPC .... *A61B 17/8802* (2013.01); *A61B 2017/883* (2013.01); *A61B 2017/8844* (2013.01); *A61F 2002/4631* (2013.01)

(58) Field of Classification Search
CPC ..... A61B 17/72; A61B 17/88; A61B 17/8802; A61B 17/8808; A61B 17/8811; A61B 17/8816; A61B 17/8819; A61B 17/8822; A61B 17/8825; A61B 17/8827; A61B 17/8833; A61B 17/8836; A61B 17/8841; A61B 2017/883; A61B 2017/8844; A61F 2/46; A61F 2002/4631
See application file for complete search history.

(56) References Cited

U.S. PATENT DOCUMENTS

| | | | |
|---|---|---|---|
| 4,455,268 A | 6/1984 | Hinrichs et al. |
| 4,515,545 A | 5/1985 | Hinrichs et al. |
| 4,559,810 A | 12/1985 | Hinrichs et al. |
| 4,574,637 A | 3/1986 | Adler et al. |
| 4,590,803 A | 5/1986 | Harrold |
| 4,758,803 A | 7/1988 | Thomas, III |

(Continued)

OTHER PUBLICATIONS

Yao et al., Power ultrasound and its applications: A state-of-the art review, Ultrasonics—Sonochemistry, 2020, pp. 1-20, Elsevier B.V.

(Continued)

*Primary Examiner* — Eric S Gibson
(74) *Attorney, Agent, or Firm* — Hudak, Shunk & Farine Co. LPA

(57) ABSTRACT

The invention comprises a system which determines the cure status of bone cement which is then used in making surgical decisions on the cement use and further comprises a system for aiding in securing an implant to a bone using a cured grout or bone cement. The system includes a device which comprises a frequency sensor joined to a circuit to monitor one or more frequency signals, and to an indicator that emits a signal in response to a current emitted to the circuit by the system while monitoring the state of cure. The invention also relates to surgical methods using the system.

14 Claims, 4 Drawing Sheets

Schematic Diagram of Resonant Frequency Based Detection of Cement Cure State

(56) References Cited

U.S. PATENT DOCUMENTS

| | | | | |
|---|---|---|---|---|
| 4,868,237 | A * | 9/1989 | Hoff | A61L 24/0073 |
| | | | | 524/437 |
| 4,874,948 | A | 10/1989 | Cielo et al. | |
| 4,891,591 | A * | 1/1990 | Johnston | G01N 33/442 |
| | | | | 526/60 |
| 4,904,080 | A * | 2/1990 | Afromowitz | G01N 33/442 |
| | | | | 73/590 |
| 5,009,104 | A | 4/1991 | Johnson | |
| 5,145,250 | A | 9/1992 | Planck et al. | |
| 5,911,159 | A | 6/1999 | Choo et al. | |
| 6,644,122 | B2 * | 11/2003 | Borowczak | G01N 29/46 |
| | | | | 73/598 |
| 6,675,112 | B1 * | 1/2004 | Chadwick | G01N 29/42 |
| | | | | 702/56 |
| 7,245,371 | B2 | 7/2007 | Wang et al. | |
| 8,347,723 | B2 * | 1/2013 | Questo | G01N 29/04 |
| | | | | 73/866.5 |
| 8,419,640 | B1 | 4/2013 | Saha | |
| 9,297,789 | B2 * | 3/2016 | Djordjevic | G01N 29/028 |
| 12,303,178 | B2 * | 5/2025 | Funk | G01N 25/12 |
| 2006/0000284 | A1 * | 1/2006 | Sherman | A61B 17/8802 |
| | | | | 73/645 |
| 2006/0123914 | A1 | 6/2006 | Pena et al. | |
| 2007/0154874 | A1 | 7/2007 | Sherman et al. | |
| 2007/0233147 | A1 * | 10/2007 | Vendrely | A61M 5/31 |
| | | | | 606/92 |
| 2007/0270786 | A1 | 11/2007 | Higham et al. | |
| 2009/0084978 | A1 | 4/2009 | Chandler et al. | |
| 2009/0112365 | A1 | 4/2009 | Orr et al. | |
| 2010/0087827 | A1 | 4/2010 | Baroud | |
| 2010/0110436 | A1 | 5/2010 | Chandler et al. | |
| 2013/0035561 | A1 | 2/2013 | Sharkey et al. | |
| 2016/0113772 | A1 * | 4/2016 | Rawlinson | A61B 17/7061 |
| | | | | 623/17.11 |
| 2021/0302374 | A1 * | 9/2021 | Jack | G01N 29/0645 |
| 2022/0296289 | A1 * | 9/2022 | Funk | A61F 2/482 |
| 2023/0301698 | A1 * | 9/2023 | Funk | A61L 24/06 |

OTHER PUBLICATIONS

Price et al., Polymerization of Methyl Methacrylate Initiated by Ultrasound, Macromolecules, 1992, pp. 6447-6454, vol. 25, American Chemical Society.

Arenas-Arrocena et al., New Trades for the Processing of Poly(Methyl Methacrylate) Biomaterial for Dental Prosthodontics, 2017, pp. 43-74, Chapter 3, Intech.

Dunne et al., Ultrasonic characterization of the mechanical properties and polymerization reaction of acrylic-based pone cements, Journal of Engineering in Medicine, 2007, pp. 251-261, vol. 221.

McHugh, Ultrasound Technique for the Dynamic Mechanical Analysis (DMA) of Polymers, BAM-Dissertationsreline-Band31, 2008, pp. 1-146, Berlin.

Lionetto et al., Monitoring the Cure State of Thermosetting Resins by Ultrasound, Materials (Basel), 2013, pp. 3783-3804, MDPI.

* cited by examiner

Figure 1: Schematic Diagram of Resonant Frequency Based Detection of Cement Cure State

Figure 2: Measured PMMA Cement Temperatures and Frequency Spectra Vs. Cure Time

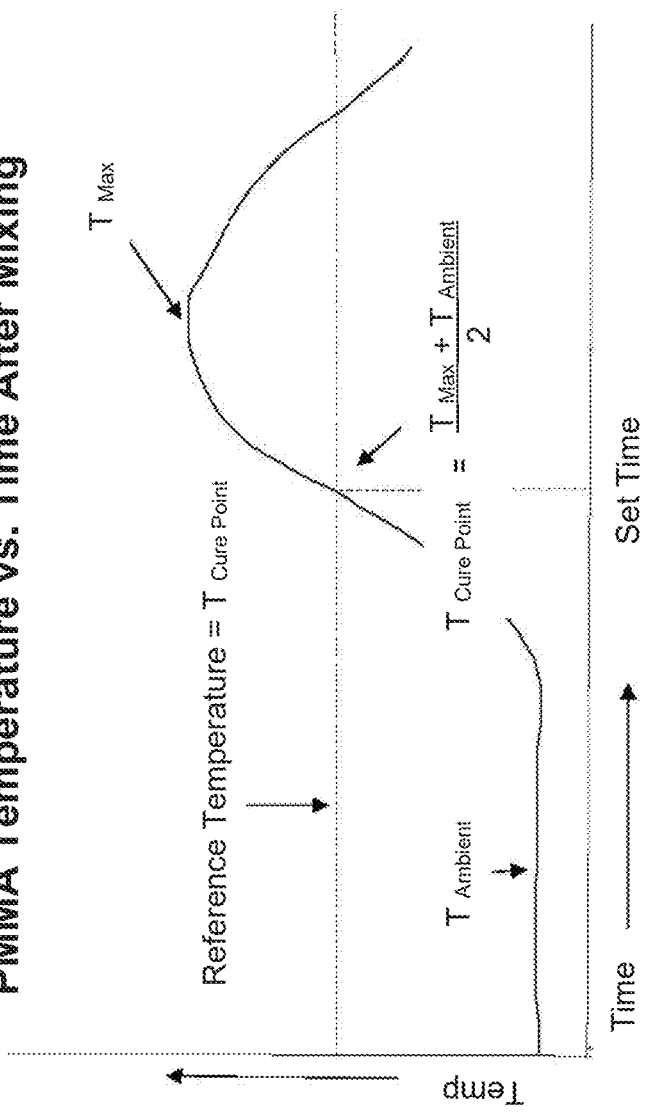

SYSTEMS AND METHODS FOR MONITORING THE CURE OF PMMA BONE CEMENT DURING SURGERY

FIELD OF THE INVENTION

The field of this invention is in the area of medical devices, and in particular, medical device systems for use in assessing the degree of cure of bone cement during surgery, as well as to methods of use of the devices, including surgical methods using the system.

BACKGROUND OF THE INVENTION

The present invention addresses issues relating to a method for the determination of the state of cure of bone cement or grout used in present surgical procedures. The state of the art for determining the state of cure of the PMMA (polymethylmethacrylate) intraoperatively is problematic, as it is generally determined either by direct palpation of the PMMA edge or by allowing extra PMMA not used in the surgical implantation to harden. This invention provides a quantitative solution to the issue of cure during preparation for device implantation and following implantation.

Acrylic bone cement has been used in orthopedic surgery for over fifty years and is the standard of care for fixation of total joint arthroplasty. After mixing the liquid MMA (methyl methacrylate) monomer with the powdered pre-polymer PMMA, the cement converts from liquid to solid by an exothermic reaction. Notably, the MMA monomer fumes are both foul smelling and potentially dangerous, and the exothermic reaction produces a substantial amount of heat, both issues presenting possible complications during the surgery. Moreover, the duration of full polymerization (i.e. "cure") is variable and depends on multiple factors, including ambient temperature and ambient humidity.

The ASTM Standard specification for full orthopedic cement curing in a testing environment is based on the temperature of the cement (shown in FIG. 1). The cure temperature ($T_{cure}$, i.e., the temperature where the cement is considered fully cured) is approximately halfway between the maximum temperature of the cement during curing ($T_{max}$) and the ambient beginning temperature of the cement ($T_{ambient}$). The success of total joint replacement, such as total knee replacement (TKR) and total hip replacement (THR), surgery is dependent on several factors with the cement technique being an important one since implants are known to fail at the cement/bone interface, appearing as radiolucent lines and attributed to poor penetration of the cement into the bone.

Since the beginning of its use, misunderstandings of the manner in which the cement functions may have led to failures in the success of the implant surgery (i.e., "surgical revisions" requiring a failed implant to be removed and where possible replaced). It is now known that cement achieves a mechanical bond to the bone by penetration into the pores of the cancellous bone where it hardens. This causes a micro-interlock interface, and the current cementing or grouting techniques are intended to improve this micro-interlock and to improve the safety conditions involving the mixing of the cement components, which generally includes a pre-polymer PMMA and a noxious MMA monomer. One technique for improving this penetration is use of the mixed cement at the proper stage of cure which is presently difficult to determine and estimated based on surgical staff experience.

The question of suitable cure stage is influenced by a number of factors, including, for example, the ambient temperature, the exact composition of the cement, the ambient humidity, and mixing conditions. Additional factors that affect the clinical performance of the cement include the use of antibiotic additives, mixing methods, sterilization of the implants and instruments, temperature during handling, contamination by biological debris, mechanical properties, and state of the bone which receives it.

The "cure" also known as polymerization or cross-linking, is initiated by an initiator and/or catalyst and generates heat in the form as an exothermic reaction. As previously mentioned, this heat is one sign of the cure process which is presently imprecisely observed to determine the state of cure subjectively. For example, the observation of a change in the surface gloss is indicative that the composition has reached the glass transition point which marks a significant point during the cure reaction. However, the heat generated during the reaction is also potentially problematic for the biological environment as it can be rather high and can harm the patient/cement interface to the detriment of the surgical outcome.

Surgical cements generally are provided in two varieties for use in different procedural applications: medium viscosity (MV) and high viscosity (HV). Following mixing, all bone cements reach a higher viscosity state ("dough state" or "semi-cured state") and MV cements reach that higher dough state somewhat later than HV cements and the techniques for use vary accordingly. Medium viscosity cement is sometimes classified as having dual phases i.e. low viscosity (prior to reaching its dough state) and medium viscosity (once the dough state has been reached). In contrast, high viscosity cements reach dough state quickly after mixing, and therefore do not have a low viscosity state. HV cement needs to be used immediately from the start of its dough time, to optimize its working time. The optimum time for cement application to the metal implant in joint replacement surgery, is just before the cement has reached this dough state (i.e. while the cement is tacky) to aid adherence to the implant. For high viscosity cements, the cement should be used as soon after mixing as practical.

Following are some useful definitions to understand the relevant terms and concepts involved in cement use and cure:

Glass Transition Temperature: glass transition temperature of a polymer is the temperature at which an amorphous polymer moves from a hard or glassy state to a softer, often rubbery or viscous state. This is marked by a change in the surface appearance from a shiny reflective surface to a dull or matter surface and is presently significant in the determination of when a cement is ready for use. However, it is also dependent on lighting conditions and line of sight, which can be an issue in a crowded operation room (OR).

Dough time: the change in physical condition of the cement which results from the initial polymerization of the liquid monomer with the powdered pre-polymer and identified by an increase in cement viscosity (in which it become stiffer and less runny), a change to a dull appearance, and reduced tackiness against surgical gloves.

Working time: sometimes referred to as "dough state" is the appropriate period of time for implanting the cement in the semi-cured "dough state" and prior to full cure or polymerization for a given ambient temperature according to its specific instructions for use provided in the use instructions.

Cement setting or curing time: is the time when the cement hardens as a result of fuller polymerization.

Working time/temperature chart: a chart contained in the use instructions that defines the available working time for a given ambient temperature. This is the optimal time period for application of the cement in its semi-cured state.

Ambient temperature: the temperature of the surrounding environment in the operating room. It can also refer to the temperature of the cement components prior to the release of heat from the exothermic reaction.

Final pressurization: the final application of pressure to securely seat the implant within the bone cement by means of bringing the joint, with the implant, into extension and holding it there until the cement cures.

Joint Preparation Instruments—Clearance: these instruments provide clearance around the implant for a cement mantle. Thus, removing a larger diameter of bone than the implant. Alternatively the joint may be prepared for Non-Clearance, commonly known as line to line instruments, which removes the same diameter of bone as the implant.

Presently, assessing the state of cure of bone cement during implant surgery requires a great deal of experience on the part of the surgical team, and is generally determined as discussed by blindly allowing the passage of time after mixing or by visual examination of a spare sample of mixed cement which is watched and sometimes touched for signs of cure, and specifically for a matte appearance to the surface, and after use by palpating the cement edge or by allowing the remainder cement to harden in vitro. These methods are imprecise, subjective, and unscientific and require time and experience to master any knowledge of cure. Moreover, intraoperative observation by surgeons has noted that in vivo cement appears to cure faster than the remaining excess cement in vitro. This is likely because the in vivo cement is in a warmer and more humid environment. Therefore, judging the state of cure after implantation through observation of an excess sample of cement can be mis-leading.

The state of cure during use directly influences the viscosity of the cement and the ease of application and fill as well as penetration into the environmental bone. It is critical that the cement have an appropriate amount of cure during its application for the proper structure to result after full cure. If it is too early, it is runny and hard to control, may lead to poor pressurization and reduced penetration, and will subject the bone to excess heat during further cure. This also carries the risk of higher heat discharge, which can harm the tissue, from the exothermic reaction of the polymerization. If it is too late, it is too stiff, and will may reduce the flow of the cement into the bone to inhibit penetration into the bone and potentially not conform or adhere within the environment and to the implant and also reduce the interfacial strength of the cement with the implant.

The significance of cement curing time has become more important with recent investigations into the cause of aseptic loosening of a total knee tibial implant. It has been proposed that lipid infiltration between the tibial tray and the cement interface prevents the cement from interdigitating with the undersurface of the tibial tray, resulting in an area of de-bonded cement. Motion prior to full cure of the tibial tray cement can hydraulically wick lipids into the cement/tray interface. As a result, accurate determination of curing of the cement under the tibial tray before knee motion during total knee arthroplasty is important.

Aseptic loosening of the tibial plateau base plate after total knee arthroplasty remains one of the primary reasons for revision surgery of total knee arthroplasty. There is evidence that breaking of the cement implant bond at the time of surgery is a contributor to the development of aseptic loosening. Movement of the knee prior to cement cure can be a cause of migration of lipids under the base plate and breaking of the cement implant bond. Recent focus has been on lipid infiltrating under the tibial tray. This infiltration prevents the cement from obtaining a secure mechanical bond on the tibial tray. New tibial implant designs have been developed to decrease the possibility of lipid infiltration. Motion of the knee prior to cement cure can increase the risk of lipid infiltration and subsequent debonding, even with the new tray designs, motion of the knee prior to cement cure remains a possible source of aseptic loosening. There is an ongoing debate whether certain implants are more susceptible to aseptic loosening or a two-batch technique with full cure of the tibial tray before proceeding with the remainder of the surgery should be the standard of care.

The prior art has presented various solutions to the issues of monitoring or determining cure states during polymerization, some of which involves the use of sound waves to monitor the attenuation or impedance of the sound waves through a sample of the cement.

U.S. Pat. No. 8,347,723 to Questo et al. provides a technology using a sonic resonator having a transducer probe that physically contacts the sample to be tested to test the adhesive bond strength in a composite material. Ultrasonic waves are generated and sent to a probe tip and acoustical impedances between the probe and the material shows up as reflections signals. The present technology differs in the use two transducers in series in which an electromagnetic actuator generates a pressure excitation waved through the piezo crystal which is only used as a receiver. In this invention the sound waves travel into the cement in some stage of cure and the acoustic interface is analyzed to pick up a totally different generation of new frequencies of waves as the polymerization proceeds. The use of the generation of a new frequency wave is a key distinction and advantage over the Questo et al. prior art as new frequencies are readily detectable in noisy environments, such an operating room.

U.S. Pat. No. 9,297,789 to Djordjevic et al. also uses ultrasonic direct contact but uses a small reference notch in the probe to measure the background signal so that a ratio can be taken to reduce noise. This technology does not use a second transducer in series, instead it also looks at interface impedances. Again, this technology does not suggest using the generation of new frequencies in the cement to monitor the state of cure. U.S. Pat. No. 5,145,250 to Planck et al relates to sensing the temperature and pressure of a polymer during cure inside an automated cement mixer. US Patent Publication No. 2009/0112365 to Orr et al. uses a defined property of the cement, and including one or more of the ambient temperature, the ambient humidity, the viscosity of the cement or the speed of sound through the cement which is measured using ultrasonic transducers to monitor the cure state of the cement. US Patent Publication No. 2021/0302374 to Jack looks for potential fail points in composite laminates and uses sound to create an image of the internal morphology of an adhesive layer or interface. This reference is similar to taking a sonogram of a test sample to see changes in hardness via an acoustic reflection from changes in acoustic wave impedance. A reference entitled "Ultrasonic characterization of the mechanical properties and polymerization reaction of acrylic-based bone cements" by Dunne et al, DOI: 10.1243/09544119JEIM168 2006 teaches using the application of sound waves to a sample immersed in water (similar to sonar) to detect the change in the acoustic impedance via reflection. It requires a liquid interface to give time of flight information of the cement sample.

None of the prior art uses the detection of new generated frequencies during cure, nor do they teach not electromagnetic voice coil transducers (Tx) in series with piezo (Rx) to detect the change in cure via generation of a new frequency. The present invention requires little signal analysis or processing since detection of new frequency generation is arbitrarily very sensitive and immune to noise and background interferences, and since the amplitude of the frequency or a comparison of the relative amplitude of frequencies can be used to determine an amount of cure of the monitored sample.

Thus, it has been shown that is desirable to be able to provide an improved method to monitor both the degree and the rate of cure of the PMMA cement or grout so as to enable the optimal state for use and further to determine the full cure to allow proper final pressurization and to document that hardening of the PMMA has been achieved during surgery. More accurate determination provides for decreased surgical time and better protection from PMMA implant bond breakage. No device or system is known which presently provides this assurance.

The present technique to assess for cement cure in-vivo at the time of surgery is imprecise. The devices and methods of the present invention are unique and novel. When used in combination these methods and devices would help facilitate surgical efficiency, provide assurance to the operating team as to the state of cement cure during the procedure and protect the knee from early motion until full cement cure. Presently, determining the state of cure of the cement intraoperatively is, at best, imprecise. The state of the art of using remainder in vitro cement to determine cure has changed little from the early days of arthroplasty. Waiting for the extra cement to cure is a time-honored artistic ritual for surgeons and staff.

SUMMARY OF THE INVENTION

The present invention addresses issues relating to cure of bone cement or grout which is used in conjunction with present surgical procedures. In particular, the present invention provides a system having a sensor which utilizes sound waves to allow the user to monitor the state of a reaction of the substance and to receive an alert when a set condition has occurred.

The system enables the user to place a wave sensor in direct or indirect contact with the cement within a mixing vessel and after implantation during major orthopedic surgery, such as, for example total knee replacement surgery. This system comprises a tester that includes an acoustic transducer which acts as a signal transmitter which is in series with an acoustic and/or ultrasound sensor which acts as a signal receiver to monitor a change in the frequency or frequencies in response of the signal as an indication of cure of the cement. The resultant sensor is joined to a controller that receives the data generated by the sensor in use, monitors it for the noted change or changes, and accordingly, alerts the user, such as by a visual or audible sign that the desired state has been reached.

A method of using the system is accomplished such as by the use of a fixture and/or drill guide which is designed to work within an established work flow method, and by using a tester (sensor probe) including a mechanical vibrational frequency sensor such as an electro-mechanical transducer that imparts mechanical vibrations into a solid probe that makes contact with the cement to be monitored. The mechanical vibrations of the transducer have a characteristic resonant acoustic frequency spectrum that is modified by the hardness of the cement that it touches. This spectrum is obtained via a Fast Fourier Transform (FFT) and the changes in the cement cure state hardness for example, at the interface of the cement and probe tip or through the cement or at the interface of the cement and the container in which it is contained, produces a distinctly new frequency peak that can be unambiguously detected. The FFT spectra of the sensor assembly can determine the moment that the cement has reached a defined condition, such as a desired cured state by generation of a new frequency peak. The detection of the generation of new frequency peaks is typically much more sensitive than detection of a linear change in some physical property because frequency generation can be arbitrarily filtered and amplified greatly for a high signal to noise ratio. The signal that results can be processed using either and analog or digital means. Typically, hardness changes registered as frequency peak changes which can be analyzed using computer-based algorithms in either hardware such as digital signal processing (DSP), field programmable gate arrays (FPGA), or in software (C/C++ etc).

The concept of an in-situ cement hardness sensor that monitors the state of the chemical reaction progress for PMMA cement that has been applied between the medical device and the bone while in-vivo (i.e., within the patient anatomy, and preferably at or within the actual implant cement interface) is novel. The analysis of the generated acoustic resonant frequency spectra from the in-vivo measurement to determine unambiguously, the state of the cement cure point is also novel in that it uses a unique conditional related to the cement cure state hardness, but does not depend on the absolute temperature, which can vary greatly depending on the application and environment in which the cement is used and which is also free from the issues relating to extraneous environmental noise.

A method of using the system is accomplished within an established work flow method, and by using the tester including a wave sensor that converts a wave response into a signal that can be processed using either and analog or digital means. Typically, these changes are registered as voltage changes which can be analyzed using analog comparator circuits to provide outputs to a logic circuit operatively joined to an indicator, such as a display, light, alarm, haptic indicator or robotic surgical device. Alternatively, the wave signals can be digitized using an analog to digital converter (ADC) and the digital representation of the wave or wave change is analyzed to drive a logical indicator. The concept of an in-situ sound sensor that monitors the frequency response to monitor the state of the chemical reaction progress for PMMA cement is novel.

BRIEF DESCRIPTION OF THE DRAWINGS

FIG. 4 shows the cement cure temperature and its first and second derivatives used to determine the exact time of the cure point.

DETAILED DESCRIPTION OF THE INVENTION

Figure 1:
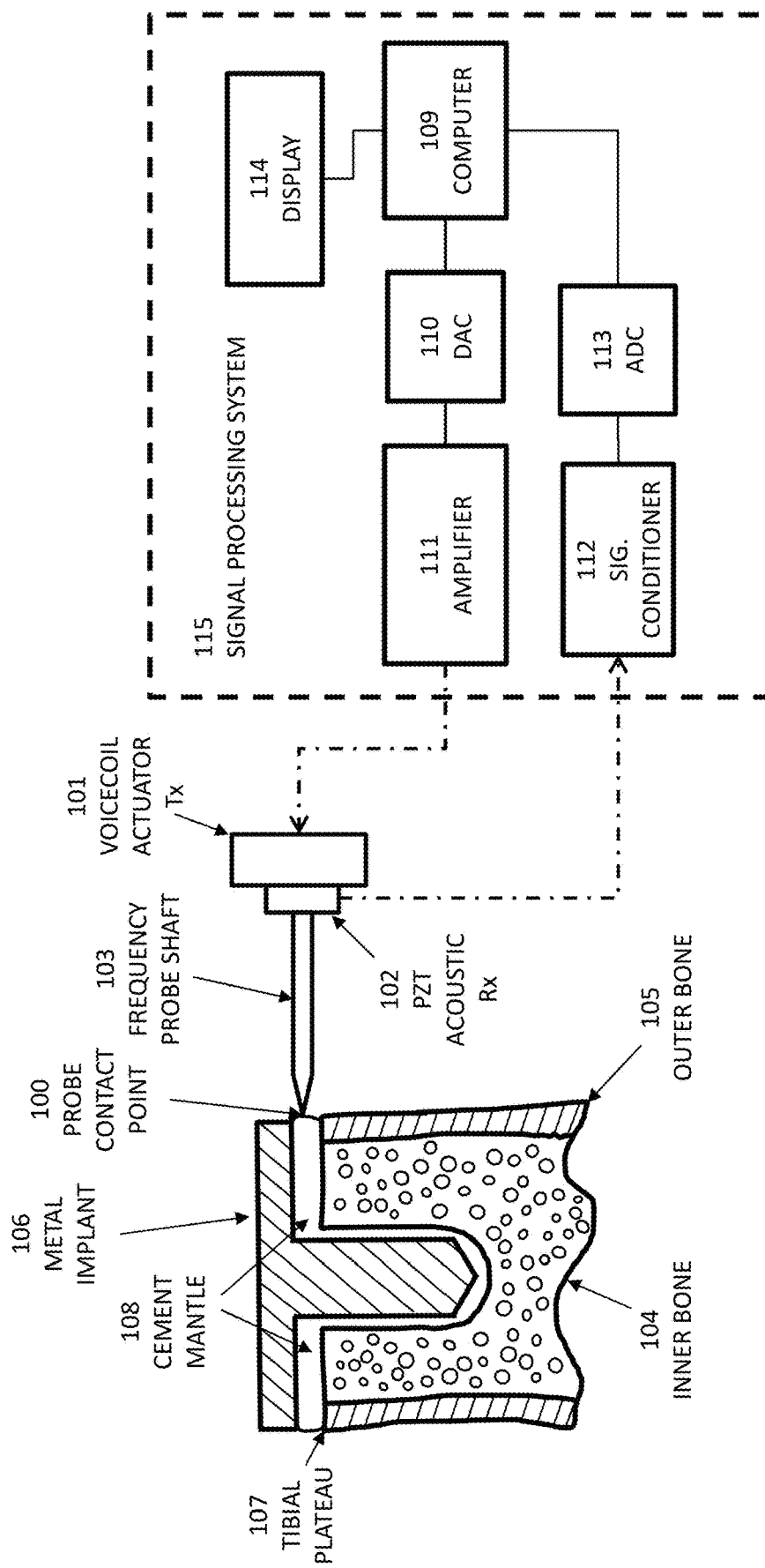
FIG. 1 is an illustration of the tester in use with a total knee replacement and showing a circuit diagram with the electronic components in accordance with the present invention.
Figure 2:
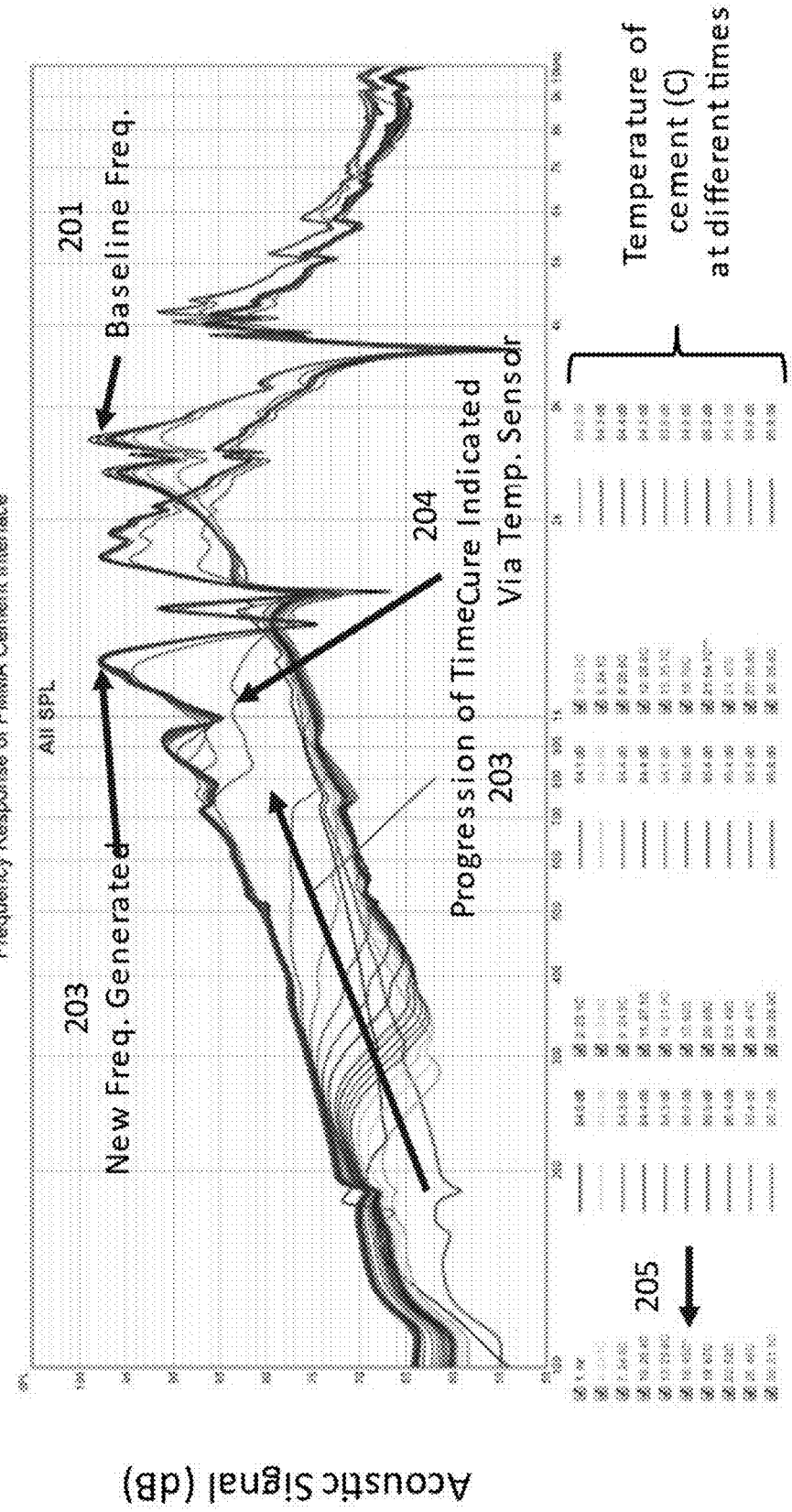
FIG. 2 is series of FFT spectra of the resonant frequency as a function of cure time and associated cement temperature of PMMA after mixing which demonstrates the cure profile of this sample.

The standard means for stabilizing orthopedic implants used in total joint arthroplasty is grouting with an acrylic (poly methyl methacrylate, aka "PMMA") material. In use, the PMMA is supplied in two parts: a powder monomer and a liquid catalyst. These two components are mixed during surgery and proceed from a liquid to a solid at varying rates depending on multiple factors such as temperature and humidity. The PMMA in its pliable state, known as the "dough state" is applied to the bone ends with the implant then being pushed onto the bone with the PMMA between the bone and implant. After hardening, the implant is considered fixed to the bone and motion is allowed. Motion prior to PMMA hardening can lead to lipid infiltration underneath the implant which breaks the bond between the PMMA and the implant leading to loosening and possible need for revision surgery.

The present state of the art for determining full curing of the PMMA intraoperatively is crude. This is ascertained either by direct palpation of the PMMA edge or by allowing the extra PMMA not used in implantation to harden. It is desirable to be able to provide a better, quantitative means to determine the full cure and to document that hardening of the PMMA has been achieved during surgery. More accurate determination would provide for decreased surgical time and better protection from PMMA implant bond breakage.

Theory and Analysis

PMMA undergoes an exothermic reaction during cure. During the phase transition of PMMA from liquid to solid (curing) the exothermic reaction has a thermal curve shown in FIG. 4. PMMA cure temperature is represented by Reference Temperature (T cure Point) which is determined in a calculation between the maximum temperature and the ambient temperature. This cure point has been standardized for Orthopedic PMMA as referenced in the ASTM Designation: F451-16, "Standard Specification for Acrylic Bone Cement of the Joint in Preparation of Finishing the Surgery."

A great deal of work has been done to analyze the polymerization rates of polymers in order to optimize molding conditions and manufacturing methods. This body of work relates to the present invention as it informs the cure process and the thermodynamic analysis of the reaction as it proceeds. It is therefore useful to review this work for an understanding of the very complex polymerization process and for the desired quantification for cure rate as it relates to the present invention.

Lionetto, F.; Maffezzoli A., report in "Relaxations during the post cure of unsaturated polyester networks by ultrasonic wave propagation, dynamic mechanical analysis and dielectric analysis." J. Polym. Sci. Polym. Phys. 2005, 43, 596-602 on the frequency and temperature dependence of two relations related to 1) the glass-transition temperature of a partially cured sample and 2) the glass-transition temperature for a fully cured sample over 6 decades of frequency in post-cure polyester networks. Specifically, these authors subjected cured samples to longitudinal ultrasonic waves at 2 MHz transmitted from a piezoelectric transmitter to a piezoelectric receiver through a sample in the form of a thin disk 30 mm in diameter and 2 mm in thickness. The samples were low molecular weight isopthlatic unsaturated polyester resins formed as the polymerization product of polyester oligomers dissolved in a reactive solvent (styrene). Their interest ultimately related to further knowledge of the isothermal post-cure behavior of sheet molding and bulk molding compounds, but the analysis involved the thermodynamic characterization of the polycondensation/addition reaction. The authors identified 2 phase transformations relating to gelation and vitrification. As part of this work, the authors used low frequency dynamic mechanical analysis of thin sample strips of 40 mm×9 mm×1.5 mm at 1 Hz and at 1% strain during heating from 30° to 200° at 2°/minute, to verify the results of their longitudinal wave ultrasound investigation. The authors concluded that the peaks observed were the result of a first low temperature relaxation attributed to the sample and further to additional cross-linking due to a kinetic controlled reaction and a second peak resulted from a change to a diffusion controlled crosslinking reaction and corresponding to the maximum glass transition temperature illustrating the full cure, and from the empirical data they were able to calculate the free energy of the system G. They also conclude that the ultrasonic wave propagation is related to the viscoelastic behavior which is described by the complex modulus and can be obtained from measurements of c and α and that when the sample dimension normal to the acoustic wave is large in comparison with the wavelength, the wave propagation is governed by the complex bulk longitudinal modulus (L)

$$L^* = L' + iL''$$

The real and imaginary components can be calculated as follows:

$$L' = \frac{\rho c^2 \left[1 - \left(\frac{a\lambda}{2\pi}\right)^2\right]}{\left[1 + \left(\frac{a\lambda}{2\pi}\right)^2\right]^2} \text{ and } L'' = \frac{2\rho c^2 \left(\frac{\alpha\lambda}{2\pi}\right)}{\left[1 + \left(\frac{a\lambda}{2\pi}\right)^2\right]^2}$$

For the studied systems, the term αA/2π always remains lower than 0.05; therefore L' and L" can be calculated as follows:

$$L' = \rho c2 \quad L'' = 2\rho \frac{C^3 \alpha}{\omega}$$

where ω is the angular frequency and ρ is the density of the resin, which is assumed to be constant and equal to 1100 kg/m³ because, in comparison with the velocity change during crosslinking (more than 70% of the initial value), the density change (ca. 5%) can be neglected with a good approximation.

The authors also studied dielectric results and concluded two peaks can be observed in the dielectric loss factor, where similarly to dynamic mechanical and ultrasonic results, the first peak can be attributed to devitrification and cure reactivation. The further increase in the crosslinking density leads to a reduction in the molecular mobility and dielectric losses. As previously observed, the residual reactivity decreases with increasing iso-thermal cure of the first cure step because of an increase in the degree of cure of the networks developed in the isothermal cure. These authors subsequently plotted the logarithm of the frequency (log f) versus the reciprocal of the temperature of the dynamic mechanical, dielectric and ultrasonic loss factor peaks. Thus, Lionetto and Maffezzoli were able to show a good correlation of the frequency of the experimentally derived data with the Williams-Landel-Ferry equation derived from free volume theory interpretation of the glass-rubber transition $$\log \frac{f}{f_0} = \frac{-C_1 * (T - T_0)}{C2 + (T - T_0)}$$

where $f_0$ and $T_0$ are the reference frequency and temperature and are taken to be 1 Hz and T measured at 1 Hz, respectively. The constants C and $C_2$ have values of 22 and 111.9K, respectively, and have been obtained by an onlinear fitting procedure.

In a later publication, Monitoring the Cure State of Thermosetting Resins by Ultrasound Francesca Lionetto and Alfonso Maffezzoli Materials 2013, 6, 3783-3804; doi: 10.3390/ma6093783 report extensively on the theory of sound wave propagation in polymers as follows:

Ultrasonic waves are mechanical vibrations (in the region of 20 kHz-100 MHz), which propagate through very small displacements of atoms and chain segments around their equilibrium positions. In the case of polymers, the forces acting along chain segments and between molecular chains, create displacements into neighboring zones, thus, creating stress waves through the material. Several kinds of ultrasonic waves may propagate through solids, namely longitudinal waves, shear waves, Rayleigh waves (or surface acoustic waves), and Lamb waves (or plate waves). In longitudinal waves, the material is subjected to alternate local compression and expansions and the motion of the particles of material transmitting these waves is in the same direction as the propagation of the wave. In shear waves the solid is locally subjected to shearing forces and the particle motion is perpendicular to the direction of the propagation of the wave. Since gases and liquids are practically incapable of transmitting shear, for ultrasonic cure monitoring, longitudinal waves are normally preferred to shear waves, which present a very high level of attenuation in liquids and soft gel samples. However, shear waves can be used to follow the curing process after the gelation stage. Ultrasonic waves are characterized by a wavelength, amplitude of displacement, and velocity of propagation. In most applications, ultrasonic waves are generated with a transducer, which converts electrical energy into ultrasonic waves. The same transducer (or a second one) will convert the ultrasonic wave back to an electrical signal for further analysis. The acoustic characteristics of a material are determined by two parameters, the ultrasonic velocity, c; and the ultrasonic attenuation coefficient, a. The first is the velocity of propagation of elastic waves, which is calculated from the measured "time of flight", that is the time taken by the sound to propagate through the sample. The speed of sound in a homogenous medium is directly related to both elastic modulus and density; thus, changes in either elasticity or density will affect pulse transit time through a sample of a given thickness. The attenuation is a measure of dissipative energy, converted to heat, as the wave propagates through the material.

In this paper, the authors use sound velocity and attenuation as a measure of the cure and in using sound waves in their experiment conclude that it is necessary to maintain precise sample dimensions to determine an accurate assessment of the sound velocity and attenuation of the signal (for example in dynamic mechanical analysis (DMA) which looks at hysteresis or viscolelastic characteristics in responses to determine modulus as it relates to the final cure state. Their characterizations follow:

The propagation of longitudinal elastic waves can, in fact, be tracked even in liquid mixtures of monomers or oligomers. When the sample dimension normal to the direction of the acoustic wave propagation is large compared to the wavelength, the measurement of ultrasonic velocity and attenuation may be used to calculate the storage (L') and loss (L") components of the longitudinal modulus from the following expressions:

$$L' = \frac{\rho c^2 \left[1 - \left(\frac{a\lambda}{2\pi}\right)^2\right]}{\left[1 + \left(\frac{a\lambda}{2\pi}\right)^2\right]^2} \text{ and } L'' = \frac{2\rho c^2 \left(\frac{a\lambda}{2\pi}\right)}{\left[1 + \left(\frac{a\lambda}{2\pi}\right)^2\right]^2}$$

where $\rho$ is the material density; c the ultrasonic velocity; the ultrasonic attenuation coefficient; and $\lambda$ is the wavelength of propagating waves, obtained from the ratio of velocity to frequency f, ($\lambda$=c/f). In linear elasticity, the longitudinal modulus is one of the elastic moduli available to describe isotropic homogeneous materials. L' and L" are related to the bulk (K' and K") and shear (G' and G") moduli from the equations:

$$L'=K'+4/3G'(2)L''=K''+4/3G''$$

Note that these relationships are valid for plane strain conditions, where L' corresponds to the elastic modulus for specimens where the change in dimensions take place only in one direction, that is when deformations in the other two directions are constrained so that the dimensions remain unchanged. These conditions occur in specimens or structures where two dimensions are much larger than the third. When a $\lambda/2\pi<<1$, i.e., when the extent of attenuation per wavelength is small, as in most practical applications, the following simplified formulas can be used to calculate the two components of the complex longitudinal modulus:

$$L'=\rho c2; L''=2\rho c3a/\omega \quad (4)$$

where w is the angular frequency (w=2Trf).

A second set of authors, Dunne, Xu, Makem, and Orr at the Medical Polymer Research Institute and the School of Mechanical & Aerospace Engineering both at the University of Belfast, UK reported on the theory of pulse-echo ultrasonic characterizations in their paper "Ultrasonic characterization of the mechanical properties and polymerization reaction of acrylic based bone cement" published 2006 at DOI: 10.1243/09544119JEIM168. Dunne et al. reported that broadband ultrasonic attenuation is related to the viscoelastic properties of a material with specific interest in PMMA bone cement. These studies used a single transducer to generate an ultrasonic wave pulse at 2.25 MHz and to study the time of flight to determine the attenuation of the wave as a result in the change in density of the sample cement during cure.

The following PhD thesis which has a great deal of relevant general information from work on characterization of the glass transitions of fully cured epoxy resins relating to the use of sound waves in DMA analysis of polymers and the underlying theories of thermodynamics relating to the polymerization processes. "Ultrasound Technique for the Dynamic Mechanical Analysis (DMA) of Polymers" vorgelegt von B.Eng MSc Jarlath Mc Hugh aus Longford, Irland von der Fakultät III—Prozesswissenschaften der Technischen Universität Berlin zur Erlangung des akademischen Grades Doktor der Ingenieurwissenschaften, http:// citeseerx.ist.psu.edu/viewdoc/download?rep=rep1&type=pdf&doi=10.1.1.218.5019. This author investigated the influence of sound waves in the frequency range of 0.1 to 50 Hz using conventional DMA with a dual cantilever set-up at varying temperatures and used that to compare the use of the Williams Landel Ferry (WLF) equation to predict the influence of measurement frequency on the ultrasound results of his ultrasound propagation studies at a frequency of 4 MHz. relevant portions of McHugh's analysis follows:

Two macroscopic phenomena gelation and vitrification usually mark the progress of this polymerization process. The point at which growth and branching of polymer chains leads to a transition from a liquid state to a rubbery state is called gelation. At or about this transition an abrupt change in viscosity or complex modulus will be observed. As the reaction continues it typically slows as the glass transition temperature nears the set mould temperature. This gradual cessation of the reaction marks the transition from the rubbery to the glassy state of the curing material. The resin eventually solidifies unless further reaction is triggered by increasing the cure temperature. This transition is referred to as vitrification. From the perspective of a material processor it is important to follow the progression of the reaction and if possible identify the two phenomena, for example on the variation of a complex modulus curve.

Using the Williams Landel Ferry (WLF) equation it is possible to predict the influence of measurement frequency on the ultrasound results. f Determination of complex longitudinal and shear modulus as well as tan($\delta$) from sound velocity and attenuation measurements. Expression of acoustic parameters in terms of their representative moduli or tan($\delta$) is necessary to compare ultrasound measurements with conventional DMA at measurement frequencies between 0.1 and 33 Hz. All acoustic parameters are evaluated as a function of frequency and temperature using a specifically developed software package based on Fast Fourier Transformation FFT principles. Using this analysis technique, factors such as the influence of frequency on the measured sound velocity and attenuation are considered. Signal amplitude losses at material boundaries, for example due to reflection are also accounted for by employing a two sample measuring technique.

This technique was employed to measure the variations in ultrasound parameters that are related to changes in viscoelastic properties of epoxy polymers as a result of the curing reaction. Only isothermal cure is monitored over a range of temperatures using transducers operating in transmission mode at a middle frequency of 4 MHz. Interpretation of ultrasound results is possible when qualified information about the chemical reaction as well as the resulting changes in viscoelastic properties in terms of complex modulus is available. Two macroscopic phenomena gelation and vitrification usually mark the progress of this polymerization process. The point at which growth and branching of polymer chains leads to a transition from a liquid state to a rubbery state is called gelation. At or about this transition an abrupt change in viscosity or complex modulus will be observed. As the reaction continues it typically slows as the glass transition temperature nears the set mould temperature. This gradual cessation of the reaction marks the transition from the rubbery to the glassy state of the sample. Experiments are performed using a Differential Scanning Calorimeter DSC and a rheometer which are employed to obtain information relating to the degree of cure or progression of the polymerization reaction and the resulting changes in viscoelastic properties and state transitions. The analysis techniques are based on different physical operating principles making a direct comparison very difficult. The Arrhenius relation that is valid for all techniques is employed to compare results. By combining results it is possible to determine the sensitivity of the ultrasound parameters to changes in the viscoelastic properties of the epoxy during the curing reaction and specifically to the material transformations at gelation and vitrification.

The present invention is different from but related to the analysis set forth in the cited literature, which provides mathematical evidence of the empirical basis of the present invention, which is described below with reference to the drawings. The present invention uses a tester to monitor the state of cure of the PMMA after initial mixing and prior to full cure as is illustrated in FIG. 4. This is accomplished by insertion of the probe member of a tester having a frequency sensor comprising a sound wave transmitter and receiver sensor, such as an acoustic transducer which acts as a transmitter of an acoustic wave and an ultrasound and/or acoustic piezoelectric transducer which acts as a receiver of the response wave to monitor one or more frequency changes in the transmitted wave in response to changes in the curing cement. The system of the present invention also includes a guide to provide access to the cement actually used to stabilize the bone construct (i.e., "in situ"). The variance between the transmitted sound wave and the received sound wave is monitored to register and alert a user when a condition has been reached, such as the defined frequency response.

A controller, such as a CPU, loaded with analytic software, acts to analyze the frequency response and to determine a pre-set condition as a "desired dough state" in which the cement is ready for application to the bone and/or implant. In this instance, the tester probe is preferably in direct contact or optionally "coupled" to the cement after the initial mixing and during cure. When mixing occurs in a vacuum, in order to avoid venting dangerous fumes within the OR, the mixing container includes a probe tip that is in contact with the cement, such as being borne on a mixing paddle or otherwise inserted into the low pressure mixing chamber.

In a second or alternative use of the tester, the probe is inserted into a cement surface in vivo to determine the state of cure of the applied cement so that the procedure can resume at the appropriate state of cure for the cement as it actually resides on the implant or within the bone. In this instance, the controller can be programmed to alert the user immediately prior to full cure to avoid the probe adhering to the in vivo cement.

FIG. 1 shows an illustration of a device of the present invention to monitor the cure state of bone cement in place in a total knee replacement implant seated in a knee. The acoustic resonant frequency sensing system consists of a sensor probe shaft 103, in mechanical contact with a piezoelectric (or other type) electromechanical transducer 102 acting as a mechanical vibration receiver, which is in series, in mechanical contact with a second electromechanical transducer (such as a voice coil) 101 acting as a mechanical vibration transmitter. These three components 101, 102, 103 together, comprise the sensor probe assembly, and the probe shaft has a distal end or tip that is in mechanical contact with the cement to be monitored at the probe contact point 100. It may be the mechanical hardness or degree of firmness in the cement at the probe contact point 100 that modifies the mechanical resonance frequency of the sensor probe assembly 116. The cement mantle 108 forms a mechanical bond between the inner bone 104, tibial plateau 107 and the metal implant 106. The inner bone 104 is contained inside the outer bone 105 wall. The sensor probe assembly 116 is in electrical communication with the signal processing system 115 via electrical wires 117 which connect the voicecoil transmitter actuator 101 to the amplifier 111, and the piezoelectric acoustic receiver 102 to the signal conditioner 112. A computer 109, under software control and via a digital to analog converter (DAC) 110, generates an excitation frequency sweep of sinusoidal waves from approximately 100 Hz to 20 kHz over a duration of about 1 second and this signal is amplified in an audio power amplifier 111 which then produces the signal to drive the actuator 101. Mechanical vibrations in the voicecoil actuator 101 then travel through the piezoelectric acoustic receiver 102, which in turn, is transmitted mechanically and in series with the frequency probe shaft 103, and finally to the probe contact point 100. The mechanical vibrations in the sensor probe assembly 116 produce a unique characteristic resonance spectrum obtained from the FFT of the signal from the piezoelectric receiver 102 that is then transmitted to a signal conditioner 112 and is digitized using an analog to digital converter (ADC). The ADC signal is recorded and analyzed by the computer 109 running under software that can perform real time FFT's. The resulting resonance frequency spectra are then displayed on a screen/display 114.

Figure 3:
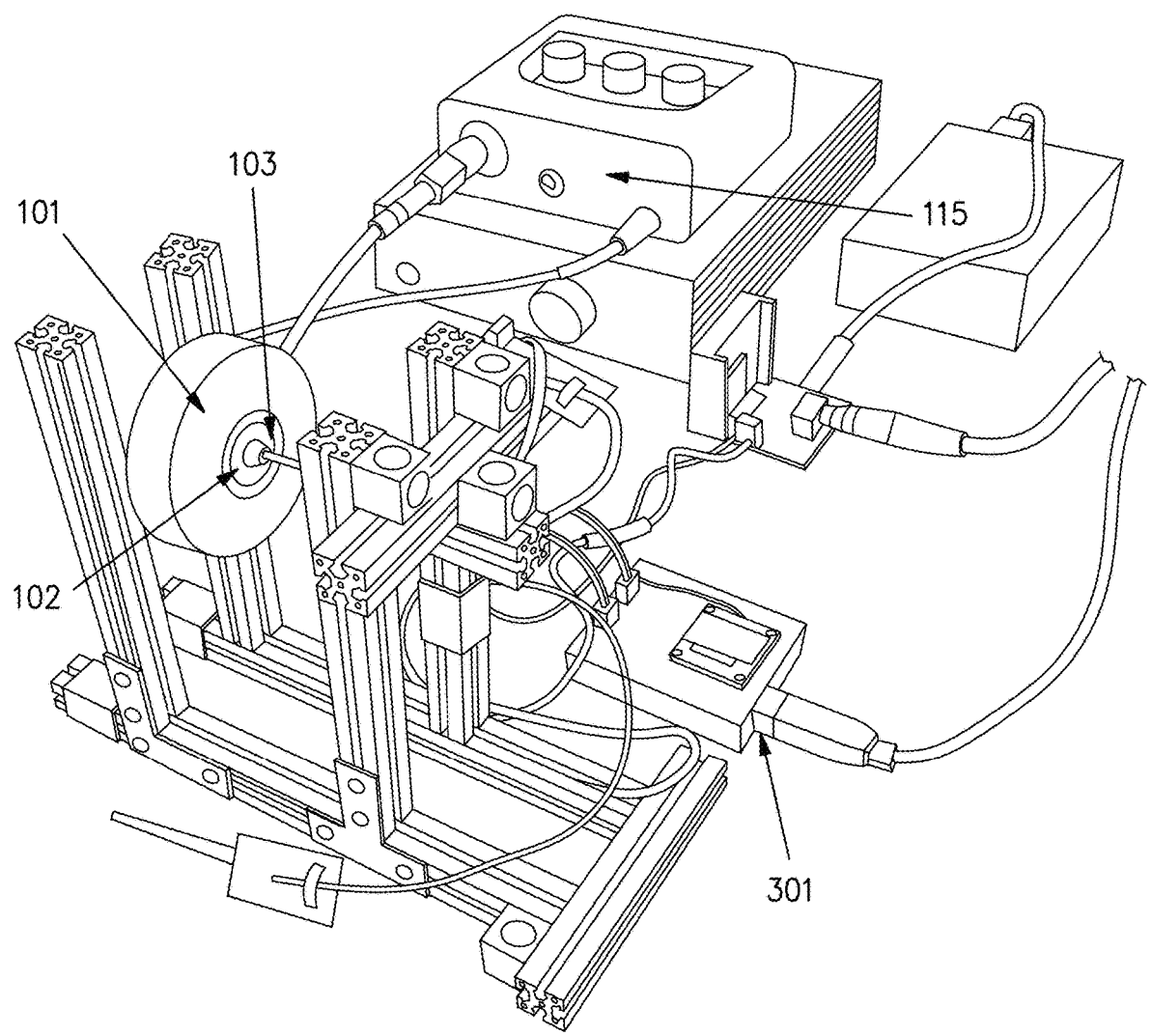
FIG. 3 is a photograph of a prototype of the present invention.

FIG. 3 shows the resulting acoustic resonant frequency spectra of the sensor probe versus cement cure time and associated cement temperature. The baseline frequency peak 201 at about 2.7 kHz represents the peak frequency associated with soft or uncured cement. As the cement hardens, there are a series of progressions of broad spectral features that rise and shift from a lower frequency of about 200 Hz up to 1 kHz as a progression of cure time 203. At about the $16^{th}$ trace (denoted in the legend by the arrow 205) the temperature of the cement suddenly reaches 62° C. only seconds later and this is accompanied by a sudden generation of a new frequency peak 202 at about 1.3 kHz. Note that a temperature inflection point based cement cure method shown in FIG. 4 also shows that the cement has cured at this point through changes in the rate of change of the temperature plus an absolute change greater than a preset value as described elsewhere [Funk et al. 2021]. This peak frequency generated and is sustained and the shape of the FFT spectra does not revert to the pre-cured state where the base peak 201 was located at 2.7 kHz. It is one theory that due to the polymerization process and free energy and/or rheological changes, the cement provides a better acoustic impedance match for the mechanical probe tip and thereby has more authority to mechanically modify the natural resonance frequency of the probe assembly structure. It is conceivable that a special mechanical assembly can be designed such that it exploits a unique resonance mode that may make the determination of cement cure point even more unambiguous. For example, it may be possible to make the assembly small and stiff to drive the natural resonance frequency of the probe well into the ultrasonic regime in order to use smaller piezoelectric transducers.

FIG. 3 shows a photograph of a prototype of the present invention. Here, the components of the probe sensor assembly are shown as the voicecoil actuator 101, the piezoelectric acoustic receiver 102, the frequency probe shaft 103, and the signal processing system 115. The prototype shown here is mounted in a fixture comprised of aluminum beams to hold the probe assembly steady and secure against a sample of PMMA cement held in place while its temperature is monitored using a thermistor embedded in the cement. It is interesting to note that indication of the cement cure point by the present invention matches the cure point predicted by means of simultaneously sensing the temperature rate of change illustrated in FIG. 4 using the apparatus 301 in another invention by Funk et al [2021].

The following section describes the mixing procedure and the conditions for use of the cement and for traditional judgement as to the state of cure, and proposes a further embodiment of the invention for use in determining an appropriate state of cure for application in the bone or on the implant prior to implantation.

The behavior of cement is strongly temperature sensitive; increasing the cement's temperature will speed up the curing of the cement, however it will result in an earlier dough-time and significantly reduced available working time.

When mixing cement, all of the powdered pre-polymer is mixed with all of the liquid monomer to ensure that the cement components are homogenous and that the cement fully polymerizes or cures. While specific surgical procedures may influence the decision when the cement is ready to apply, in general it is ready to apply to the metal implant just before the cement has reached its dough state (i.e. while the cement is still tacky) to aid adherence to the implant. The cement should not be excessively runny (or have excessive flow from the nozzle when using a syringe). Also, voids in the cement can reduce the strength of the cured cement; mixing in a vacuum system reduces the inclusion of air voids with the added benefit of reducing exposure to monomer fumes for OR staff, but the use of vacuum during mixing can also influence the setting time. In accordance with the invention, this point is determined by the use of the wave tester system of the present invention having the probe in contact with the cement following mixing, such as in the mixing bowl, on a mixing paddle, or within an applicator holding the cement prior to application on the implant or bone. Also, a syringe style holder may be designed to contain the curing cement and having a dedicated probe situated for optimal frequency analysis based on the work mentioned herein, such as having a longitudinal penetration into the curing cement sample.

Implant surfaces should be clean and dry and clean gloves should be used when cementing since the mixed cement in its working phase is incompatible with water and so aqueous liquids, such as saline or blood, will reduce its bonding strength, and lipids can also reduce the mechanical strength of the cement. The use of a haemostatic agent (e.g. a solution containing $H_2O_2$) can help reduce biological debris trapped within the bone-cement interface and is known to help improve the cement bond. Washing bone surfaces, for example with pulsatile lavage helps remove loose bone, blood, fat, and marrow also exposes the porous bone and helps to achieve penetration of bone cement so as to result in a stronger interlock at the bone-cement interface. The bone and implant should also be dried prior to applying the cement by using an absorbent pad or a dry sponge, by suction, or by a carbon dioxide jet. In areas of dense or sclerotic bone, drilling keying holes in the bone may assist in creating a greater degree of cement interdigitation.

Cement penetration into the bone can be improved using various techniques. The cement can be syringed under pressure, by or a nozzle can be seated directly onto the cut bone surface and the cement can be syringed into the cancellous bone structure. A peripheral seal can help retard later ingress of osteolytic micro-particulate debris into the bone, particularly at the periphery of the bone implant site.

Although the present invention has been described based upon the above embodiments and the data produced by measurement of the performance of the resulting invention that has been reduced to practice, it is apparent to those skilled in the art that certain modifications, variations, and alternative constructions would be apparent, while remaining within the spirit and scope of the invention. In order to determine the metes and bounds of the invention, reference should be made to the following claims.

What is claimed is:

1. A system for securing an implant to a bone during surgery, comprising an implant, a grout or bone cement comprising a composition that cures during the surgery, the grout or bone cement being capable of securing the implant to the bone in a cured state, and a sensor which imparts an energy wave in an acoustic range to the grout or bone cement and receives the energy wave from the grout or bone cement and monitors a frequency change in the energy wave to determine a cure state of the grout or bone cement and the sensor also being joined to a circuit and to an indicator that emits a signal in response to a current emitted to the circuit by the sensor.

2. A system for securing an implant to a bone as set forth in 1, wherein the signal is an audio signal, visual signal or haptic signal or signal to a robotic device.

3. A system for securing an implant to a bone as set forth in 1, wherein the grout or bone cement is an acrylate.

4. A system for securing an implant to a bone as set forth in 3, wherein the acrylate comprises methyl methacrylate or poly methyl methacrylate.

5. A system for securing an implant to a bone as set forth in 1, wherein the bone is a human bone.

6. A system for securing an implant to a bone as set forth in 1, wherein the implant is an intermedullary implant.

7. A method for securing an implant to a bone, comprising: the steps of surgically exposing a bone and selecting an implant, applying an adhesive, grout or bone cement to the implant or to the bone, the adhesive, grout or bone cement comprising a composition that cures during surgery, the adhesive, grout or bone cement being capable of securing the implant to the bone in a cured state; using a tester to determine a state of cure of the adhesive, grout or bone cement, the tester comprising a frequency sensor which transmits a signal having a frequency below 10 MHz and which receives a response of the signal propagated through the adhesive, grout or bone cement, the frequency sensor being in electrical contact with a circuit which is capable of conducting a current in response to a change in the frequency of the received signal, and to an indicator that emits a signal in response to an increase in the current in the circuit.

8. A method for securing an implant to a bone as set forth in 7, wherein the signal is an audio signal.

9. A method for securing an implant to a bone as set forth in 7, wherein the signal is a visual signal.

10. A method for securing an implant to a bone as set forth in 7, wherein the signal is a haptic signal.

11. A method for securing an implant to a bone as set forth in 7, wherein the adhesive, grout or bone cement is an acrylate.

12. A method for securing an implant to a bone as set forth in 7, wherein the acrylate comprises methyl methacrylate or poly methyl methacrylate.

13. A method for securing an implant to a bone as set forth in 7, wherein the bone is a human bone.

14. A method for securing an implant to a bone set forth in 13, wherein the implant is an intermedullary implant.

* * * * *